United States Patent [19]

Lisle et al.

[11] 4,253,156

[45] Feb. 24, 1981

[54] AUTOMATIC FLOWMETER CALIBRATION SYSTEM

[75] Inventors: Raymond V. Lisle, Indialantic; Terry L. Wilson, Cocoa, both of Fla.

[73] Assignee: The United States of America as represented by the Administrator of the National Aeronautics and Space Administration, Washington, D.C.

[21] Appl. No.: 51,274

[22] Filed: Jun. 22, 1979

[51] Int. Cl.³ ............................................... G01F 1/08
[52] U.S. Cl. .................................... 364/571; 364/510; 73/861
[58] Field of Search ............... 364/571, 509, 510, 558; 324/73 R; 73/211, 194 R, 3

[56] References Cited

U.S. PATENT DOCUMENTS

| | | | |
|---|---|---|---|
| 3,614,892 | 10/1971 | Ottenstein | 364/571 X |
| 3,831,011 | 8/1974 | Hulme | 364/571 |
| 3,839,911 | 10/1974 | Zimmerman et al. | 364/571 X |
| 3,854,038 | 12/1974 | McKinley | 364/571 X |
| 3,862,405 | 1/1975 | Beck | 364/571 X |
| 3,888,106 | 6/1975 | Last et al. | 73/3 |
| 3,895,529 | 7/1975 | Moore | 364/571 X |
| 4,044,602 | 8/1977 | Higgs et al. | 364/571 X |
| 4,118,780 | 10/1978 | Hirano | 364/571 X |

Primary Examiner—Edward J. Wise
Attorney, Agent, or Firm—James O. Harrell; John R. Mannino

[57] ABSTRACT

A system for automatically calibrating the accuracy of a flowmeter which is used for measuring the flow of fluid such as gas or liquid flowing therethrough. The system includes a calculator capable of performing mathematical functions responsive to receiving data signals and function command signals. A prover cylinder which includes a piston is provided for measuring the temperature, pressure, and time required for accumulating a predetermined volume of fluid. Along with these signals, signals representing the temperature and pressure of the fluid going into the meter are fed to a plurality of data registers. Under control of a process controller, which includes a program counter, a programmable read only memory, and decoder logic system, the data registers are read out and the information is fed through a data select circuit to the calculator. Command signals are also produced by a function select circuit and are fed to the calculator set indicating the desired function to be performed. The calculator set performs the calculation and generates a readout indicating the flow rate of the fluid. This reading is, in turn, compared with the reading produced by the flowmeter to determine if such is calibrated properly.

5 Claims, 1 Drawing Figure

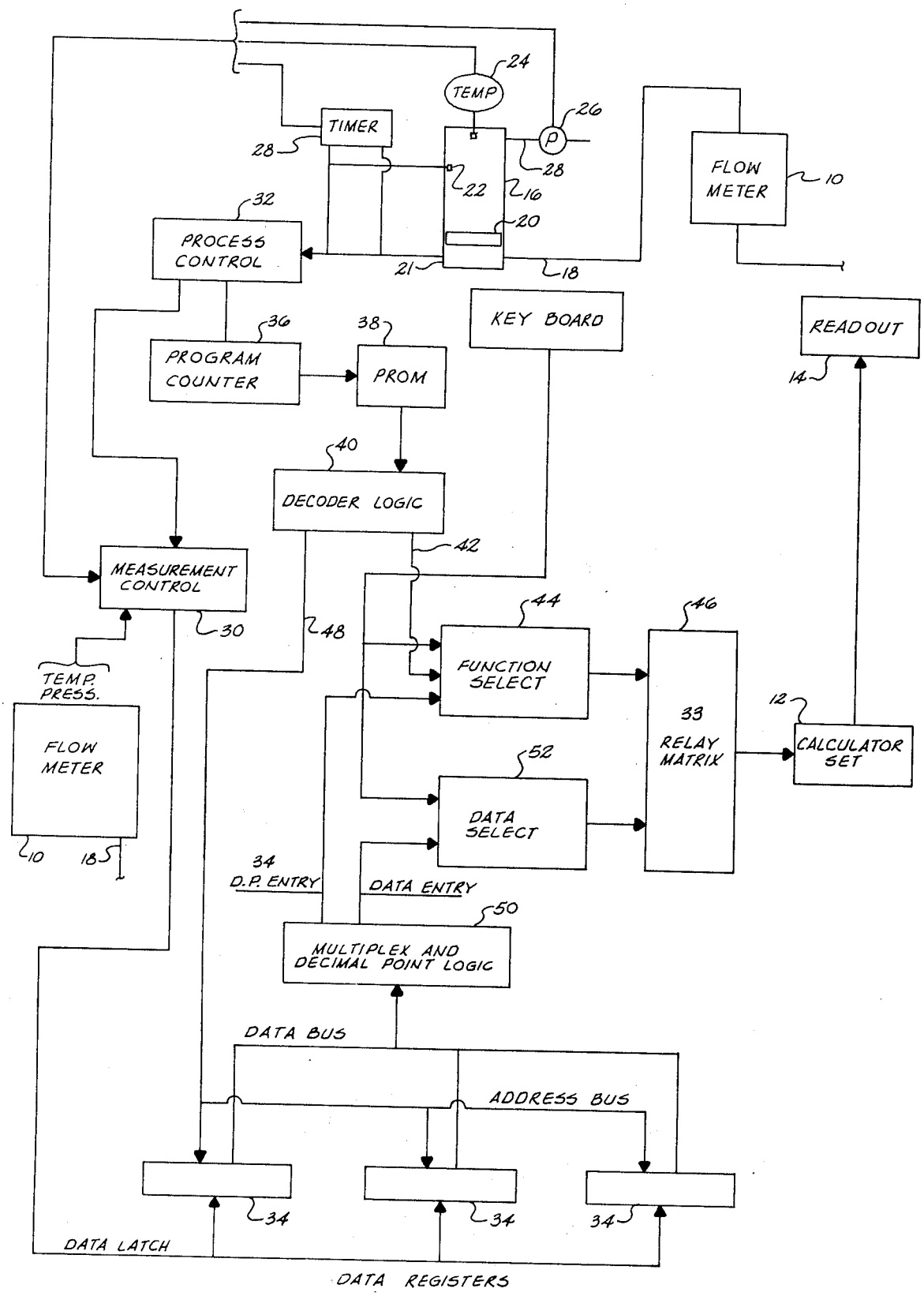

AUTOMATIC FLOWMETER CALIBRATION SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Heretofore, in order to calibrate flowmeters to determine if the readout produced thereby was accurate, it was necessary to take many different readings, depending on the type of meter being calibrated and manually perform various mathematical functions such as multiplying, dividing, and taking the square root so as to obtain a reading to be compared with the reading of the flowmeter. While if these calculations were punched into a calculator accurately they would produce a reading that could be compared with the meter reading, it was subject to error and was time-consuming. This presented a problem when there were a large number of meters to be calibrated.

Devices have been produced to automatically compute the flow rate of gas, however, oftentimes they are quite complicated. For example, in U.S. Pat. No. 3,752,393, there is disclosed a digital flow preprogrammed calculator which repeatedly solves expressions for determining the gas flow through an orifice in a pipeline. The calculator performs its calculation using digital techniques.

In U.S. Pat. No. 3,699,810, there is disclosed a device for monitoring a fluid pressure system wherein temperatures are measured and signals addressed in accordance with a predetermined program.

SUMMARY OF THE INVENTION

The invention includes a system for automatically calibrating the accuracy of a flowmeter which is used for measuring the flow of fluid such as gas. The system includes a calculator which is capable of performing predetermined mathematical functions responsive to receiving data signals and function command signals. The data signals are produced by sensors carried in a prover cylinder indicating the temperature, pressure, and time required for receiving a predetermined volume of gas. Data in the form of temperature and pressure is also collected for the flow of fluid into the meter. This data, under control of a process controller, is stored in a plurality of data registers. A program counter, which is also under control of the process controller, operates a programmable read-only memory (PROM) that, in turn, feeds signals through a decoder logic circuit to a function select circuit and to the data registers. The data is read out of the data registers according to the program set in the PROM and this information is fed to a multiplex and decimal point logic circuit for inserting a decimal point in the information at the proper location. The information is then fed through a data select, a relay matrix, into the calculator. Simultaneously therewith, a functional command is fed by a function select circuit under control of the decoder logic circuit through the relay matrix to the calculator set for performing the predetermined mathematical calculations on the information. The calculator set, in turn, produces a read-out which may be in the form of an illuminated display panel.

Accordingly, it is an object of the present invention to provide a system for automatically calibrating a flowmeter.

Another important object of the present invention is to provide a system which is relatively simple and efficient in performing a plurality of mathematical functions for calculating the flow of fluid.

Still another important object of the present invention is to provide a system for performing a plurality of mathematical functions for calculating the flow of fluid through a meter which can be either automatically operated or manually operated through a keyboard.

These and other objects and advantages of the invention will become apparent upon reference to the following specification, attendant claims, and drawing.

BRIEF DESCRIPTION OF THE DRAWING

The drawing illustrates a system in block form for performing calculations to either automatically or manually calibrate the flow rate of a flowmeter.

DESCRIPTION OF THE PREFERRED EMBODIMENT

Referring to the drawing, there is illustrated in block form a conventional flowmeter 10 which is utilized for measuring the flow rate of gas. This meter may be a rotameter or a mass flowmeter and, depending on the type of meter to be calibrated, various data is fed into a calculator 12 along with function commands for mathematically computing the actual rate of flow of fluid so that the read-out produced by a read-out display 14 can be compared to the read-out produced on the meter 10 being calibrated.

A conventional prover cylinder 16 is provided for receiving the flow of fluid through an inlet tube 18 that is being fed by the flowmeter 10 being calibrated. The prover cylinder, as previously mentioned, is a conventional prover cylinder and, as a result, it is illustrated in block form and includes a piston 20 that is moved responsive to the flow of fluid coming therein. The prover cylinder 16 is equipped with a pair of vertically spaced sensors 21 and 22 that generate signals responsive to the piston 20 moving therepass. The spacing between the sensors 21 and 22 is adjustable so that the amount of gas that is fed into the prover cylinder for displacing the piston a predetermined distance can be varied. For a particular spacing between the two sensors 21 and 22, a known volume of liquid is required for displacing the piston 20 therebetween. The prover cylinder is also equipped with a temperature meter 24 and a pressure meter 26 which may be connected to an outlet line 28 of the prover cylinder. The pressure meter 26 measures the back pressure on the piston 20. A timer 28 is provided for measuring the elapsed period of time required for the piston 20 to move past the first sensor 21 and the second sensor 22.

Data readings in the form of temperature and pressure are also taken from the meter being calibrated and fed into a measurement control circuit 30 along with the signals representing time, temperature, and pressure received from the prover cylinder 16.

In order to calculate the actual flow of fluid to the meter 10 when, for example, the meter 10 is a rotameter, calculations must be made in accordance with the following formula:

$$Q_m \text{ (actual flow rate)} = \frac{V_p \times P_{ps} \times T_p \times C}{\text{TIME} \times P_p \times T_{ps}} \sqrt{\frac{P_m \times T_{ms}}{P_{ms} \times T_m}}$$

wherein the symbols of the formula are defined as follows:

| SYMBOL | DESCRIPTION |
|---|---|
| Vp | Prover volume |
| TIME* | Prover collection time |
| Pm* | Meter pressure absolute |
| TM* | Meter temperature absolute |
| Pp* | Prover pressure absolute |
| Tp* | Prover temperature absolute |
| Pms | Standard meter pressure absolute |
| Tms | Standard meter temperature absolute |
| Pps | Standard prover pressure absolute |
| Tps | Standard prover temperature absolute |
| C | Units conversion factor |

If the meter 10 is a Mass Flowmeter, then the calculations would be as follows:

$$Q_m = \frac{V_p \times P_p \times T_{ps} \times C}{\text{TIME} \times P_{ps} \times T_p}$$

The symbol Vp which represents prover volume is set prior to the calibration taking place and is determined by the spacing between the two sensors 21 and 22. The time is the time required for the piston 20 to move between the sensors 21 and 22. The other symbols are self-explanatory.

As can be seen for the above formula for the rotameter, in order to calibrate the flowmeter if it is a rotameter, eleven parameters must be fed to the conventional calculator programmed to perform the mathematical functions as set forth above to produce an output reading representing flow rate Qm. One suitable conventional calculator is manufactured by Electronic Arrays, Inc., 550 East Middlefield Road, Mountain View, Calif. 94043, and is referred to by Model No. EAS-143.

The calibration sequence is initiated when the piston 20 passes the first sensor 21. Upon receiving this signal, a process controller 32 instructs a measurement control circuit 30 to take the temperature and pressure readings in the prover cylinder. The piston 20 is raised by the incoming fluid until it passes the second sensor 22 terminating the process. Upon the piston passing the second sensor 22, a signal is produced by the timer 28 and fed to the measurement control circuit 30 indicating the elapsed time required for the piston 20 to move from the first sensor 21 to the second sensor 22. It requires a known volume of fluid to move the piston 20 from the first sensor 21 to the second sensor 22 and, on most prover cylinders, this is adjustable.

The measurement control circuit 30 causes the measurements taken during the process to be stored in respective data registers 34 in binary coded decimal form. Since eleven parameters are required for making the calculation for determining the actual flowrate in a rotameter, there are eleven data registers storing signals or information. After all of the parameters have been stored in the data registers, the process controller which has initiated a program counter 36 causes the program counter to sequence a programmable read-only memory 38, hereinafter referred to as PROM to control the various operations for carrying out the calculations required to satisfy the above formula for determining the flowrate of a rotameter. The PROM 38 has its output connected to a decoder logic circuit 40 which generates two separate signals. On output lead 42, a command signal is supplied to a function select circuit 44 for selecting the predetermined function required. For example, it may be multiplication, division, square rooting, etc. and the function select circuit 44, in turn, produces a function command signal that is fed through a relay matrix 46 to the calculator 12.

On output lead 48, of the decoder logic circuit, a read-out signal is produced for reading the information stored in the data registers 34 out in a predetermined sequence. The information from the data registers are read-out and fed through a multiplex and decimal point logic circuit 50 which causes a decimal point to be inserted in the signal at a predetermined location. The data is fed through the multiplex and decimal point logic circuit 50 and into one input of a data select circuit 52.

The output of data select circuit 52 is connected to an input of the relay matrix which converts the signals coming from the data select circuit into decimal form. The signals coming from the data select circuit are in BCD (binary coated decimal) form, and the sole purpose of the relay matrix is to convert this information to decimal form so that it can be fed into the calculator set.

The program counter 36 advances address lines in the PROM 38 in sequence and the PROM output which is decoded by the decoder logic circuit 42 operates the calculation process.

After the calculations have taken place in the calculator set 12, the flow rate is displayed in digital form on a light display panel included in the read-out circuit 14. The reading on this panel is then compared with the reading produced by the flowmeter to determine if the flowmeter is producing an accurate reading.

While a preferred embodiment of the invention has been described using specific terms, such description is for illustrative purposes only, and it is to be understood that changes and variations may be made without departing from the spirit or scope of the following claims.

What is claimed is:

1. A system for automatically calibrating the accuracy of a flow meter measuring the flow of fluid such as gas or liquid flowing therethrough comprising:
   (a) a calculator capable of performing predetermined mathematical functions for producing a reading representing flow rate responsive to receiving data signals and function command signals;
   (b) a prover cylinder including:
      (i) a movable piston;
      (ii) first and second spaced sensor means generating signals responsive to said piston moving therepass;
   (c) means for supplying said flow of fluid to said prover cylinder causing said piston to be moved past said first and second sensing means;
   (d) means for sensing the temperature and pressure of said fluid in said prover cylinder and the time required for said fluid to move said piston past said first and second spaced sensors and generating prover temperature, prover pressure and prover time signals;
   (e) means for generating meter temperature and meter pressure temperature signals;
   (f) a plurality of data registers;
   (g) means for storing said signals representing prover temperature, prover pressure, prover time, meter pressure and meter temperature in respective data registers in the form of data signals;

(h) a function select means connected to said calculator for generating function command signals responsive to command signals;

(i) a program control means for reading out said data registers and feeding in a predetermined sequence data signal stored in said data register to said calculator and for supplying command signals to said function select means causing function command signals to be supplied to said calculator;

(j) said calculator performing mathematical functions responsive to said function command signals and said data signals and producing an output reading indicating the flow rate of said fluid.

2. The system as set forth in claim 1 wherein said program control means comprises:

(a) a program counter means;

(b) a process control means connected to receive said prover time signals and to supply signals to said program counter means for generating signals for controlling the reading out of data signals from said data registers and operating said function select means.

3. The system as set forth in claim 2 wherein said program control means further comprises:

a programmable read only memory connected to the output of said program counter means generating predetermined signals responsive to the output of said program counter means, and a decoder logic circuit means for decoding said signal from said programmable read only memory prior to feeding said signals to said data registers and to said function select means.

4. The system as set forth in claim 1 further comprising:

a manually operable keyboard means for manually generating signals for selecting the data signals to be read from said data registers and for generating command signals for operating said function select means.

5. A system for automatically calibrating the accuracy of a flowmeter measuring the flow of fluid such as gas or liquid therethrough comprising:

(a) a calculator capable of performing predetermined mathematical functions for producing a reading representing flow rate responsive to receiving data signals and function command signals, (b) a prover cylinder means, (c) means for supplying said fluid flowing through said flowmeter to said prover cylinder, (d) means for generating signals indicating the temperature of the liquid in said prover cylinder means, the pressure of the liquid in said prover cylinder means, and the time required for collecting a predetermined volume of liquid in said prover cylinder means, (e) means for generating signals representing the temperature of the fluid in said flowmeter and the pressure of said fluid in said flowmeter, (f) a plurality of data registers, (g) means for storing said signals representing the temperature of the fluid flowing through said prover cylinder means, the pressure of the fluid in said prover cylinder means, the time for collecting a predetermined volume of fluid in said prover cylinder means, and the temperature and pressure of the fluid flowing through the flowmeter in said data register in the form of data signals, (h) a function select means connected to said calculator for generating function command signals responsive to command signals, (i) a data selector means connected between said data registers and said calculator for selecting the reading out of predetermined registers responsive to command signals, (j) a program control means for reading out said data registers and feeding in a predetermined sequence data signal stored in said data register through said data select means to said calculator and for supplying command signals to said function select means causing function command signals to be supplied to said calculator, and (k) said calculator performing mathematical functions responsive to said function command signals and said data signals and producing an output reading indicating the flow rate of said fluid.

* * * * *